United States Patent
Huisenga et al.

(10) Patent No.: US 7,321,846 B1
(45) Date of Patent: Jan. 22, 2008

(54) TWO-WIRE PROCESS CONTROL LOOP DIAGNOSTICS

(75) Inventors: Garrie D. Huisenga, Chaska, MN (US); Randy J. Longsdorf, Chaska, MN (US); Donald R. Lattimer, Chaska, MN (US)

(73) Assignee: Rosemount Inc., Eden Prairie, MN (US)

(*) Notice: Subject to any disclaimer, the term of this patent is extended or adjusted under 35 U.S.C. 154(b) by 0 days.

(21) Appl. No.: 11/543,349

(22) Filed: Oct. 5, 2006

(51) Int. Cl.
*G06F 11/00* (2006.01)
*G06F 11/30* (2006.01)

(52) U.S. Cl. ..................... 702/183; 703/188

(58) Field of Classification Search ............. 702/81, 702/84, 186, 183, 188; 700/26, 28; 340/635, 340/664
See application file for complete search history.

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart | 128/2.05 R |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,849,637 A | 11/1974 | Caruso et al. | 235/151 |
| 3,855,858 A | 12/1974 | Cushing | 73/194 EM |
| 3,948,098 A | 4/1976 | Richardson et al. | 73/861.24 |
| 3,952,759 A | 4/1976 | Ottenstein | 137/12 |
| 3,973,184 A | 8/1976 | Raber | 324/51 |
| RE29,383 E | 9/1977 | Gallatin et al. | 137/14 |
| 4,058,975 A | 11/1977 | Gilbert et al. | 60/39.28 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |
| 4,249,164 A | 2/1981 | Tivy | 340/870.3 |
| 4,250,490 A | 2/1981 | Dahlke | 340/870.37 |
| 4,279,013 A | 7/1981 | Dahlke | 340/870.37 |
| 4,337,516 A | 6/1982 | Murphy et al. | 364/551 |
| 4,399,824 A | 8/1983 | Davidson | 128/736 |

(Continued)

FOREIGN PATENT DOCUMENTS

CA 999950 11/1976

(Continued)

OTHER PUBLICATIONS

Written Opinion, PCT/US02/14560, filed May 8, 2002; 6 pages.

(Continued)

*Primary Examiner*—Bryan Bui
(74) *Attorney, Agent, or Firm*—Westman, Champlin & Kelly, P.A.

(57) ABSTRACT

A diagnostic device for coupling to a process control loop includes digital communication circuitry configured to receive a digital communication signal from the process control loop. The digital communication signal is a digitally modulated analog signal on the process control loop which is modulated to a plurality of discrete analog signal levels representative of digital values. Diagnostic circuitry diagnoses operation of the process control loop which may include field devices of the process control loop based upon the digitally modulated analog signal.

25 Claims, 6 Drawing Sheets

U.S. PATENT DOCUMENTS

| | | | |
|---|---|---|---|
| 4,417,312 A | 11/1983 | Cronin et al. | 364/510 |
| 4,459,858 A | 7/1984 | Marsh | 73/861.12 |
| 4,463,612 A | 8/1984 | Thompson | 73/861.22 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,536,753 A | 8/1985 | Parker | 340/566 |
| 4,540,468 A | 9/1985 | Genco et al. | 162/49 |
| 4,571,689 A | 2/1986 | Hildebrand et al. | 364/481 |
| 4,630,265 A | 12/1986 | Sexton | 370/85 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,686,638 A | 8/1987 | Furuse | 364/558 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,758,308 A | 7/1988 | Carr | 162/263 |
| 4,777,585 A | 10/1988 | Kokawa et al. | 364/164 |
| 4,807,151 A | 2/1989 | Citron | 364/510 |
| 4,818,994 A | 4/1989 | Orth et al. | 340/501 |
| 4,831,564 A | 5/1989 | Suga | 364/551.01 |
| 4,841,286 A | 6/1989 | Kummer | 340/653 |
| 4,853,693 A | 8/1989 | Eaton-Williams | 340/588 |
| 4,873,655 A | 10/1989 | Kondraske | 364/553 |
| 4,907,167 A | 3/1990 | Skeirik | 364/500 |
| 4,924,418 A | 5/1990 | Bachman et al. | 364/550 |
| 4,926,364 A | 5/1990 | Brotherton | 364/581 |
| 4,934,196 A | 6/1990 | Romano | 73/361.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,019,760 A | 5/1991 | Chu et al. | 318/490 |
| 5,025,344 A | 6/1991 | Maly et al. | 361/88 |
| 5,043,862 A | 8/1991 | Takahashi et al. | 364/162 |
| 5,053,815 A | 10/1991 | Wendell | 355/208 |
| 5,057,774 A | 10/1991 | Verhelst et al. | 324/537 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCulloch et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,150,289 A | 9/1992 | Badavas | 364/154 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,216,226 A | 6/1993 | Miyoshi | 219/497 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,340,271 A | 8/1994 | Freeman et al. | 415/1 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,392,293 A | 2/1995 | Hsue | 324/765 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,410,495 A | 4/1995 | Ramamurthi | 364/511.05 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogura | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,481,200 A | 1/1996 | Voegele et al. | 324/718 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Broden et al. | 73/718 |
| 5,510,799 A | 4/1996 | Maltby et al. | 340/870.3 |
| 5,511,004 A | 4/1996 | Dubost et al. | 364/551.01 |
| 5,526,293 A | 6/1996 | Mozumder et al. | 364/578 |
| 5,539,638 A | 7/1996 | Keeler et al. | 364/424.03 |
| 5,548,528 A | 8/1996 | Keeler et al. | 364/497 |
| 5,555,190 A | 9/1996 | Derby et al. | 364/510 |
| 5,560,246 A | 10/1996 | Bottinger et al. | 73/861.15 |
| 5,561,599 A | 10/1996 | Lu | 364/164 |
| 5,570,034 A | 10/1996 | Needham et al. | 324/763 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,578,763 A | 11/1996 | Spencer et al. | 73/861.08 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,608,650 A | 3/1997 | McClendon et al. | 364/510 |
| 5,623,605 A | 4/1997 | Keshav et al. | 395/200.17 |
| 5,629,870 A | 5/1997 | Farag et al. | 364/551.01 |
| 5,633,809 A | 5/1997 | Wissenbach et al. | 364/510 |
| 5,637,802 A | 6/1997 | Frick et al. | 73/724 |
| 5,640,491 A | 6/1997 | Bhat et al. | 395/22 |

| Patent No. | Date | Inventor | Class |
|---|---|---|---|
| 5,644,240 A | 7/1997 | Brugger | 324/439 |
| 5,654,869 A | 8/1997 | Ohi et al. | 361/540 |
| 5,661,668 A | 8/1997 | Yemini et al. | 364/550 |
| 5,665,899 A | 9/1997 | Willcox | 73/1.63 |
| 5,669,713 A | 9/1997 | Schwartz et al. | 374/1 |
| 5,671,335 A | 9/1997 | Davis et al. | 395/23 |
| 5,672,247 A | 9/1997 | Pangalos et al. | 162/65 |
| 5,675,504 A | 10/1997 | Serodes et al. | 364/496 |
| 5,675,724 A | 10/1997 | Beal et al. | 395/182.02 |
| 5,680,109 A | 10/1997 | Lowe et al. | 340/608 |
| 5,682,317 A | 10/1997 | Keeler et al. | 364/431.03 |
| 5,700,090 A | 12/1997 | Eryurek | 374/210 |
| 5,703,575 A | 12/1997 | Kirkpatrick | 340/870.17 |
| 5,704,011 A | 12/1997 | Hansen et al. | 395/22 |
| 5,705,754 A | 1/1998 | Keita et al. | 73/861.357 |
| 5,705,978 A | 1/1998 | Frick et al. | 340/511 |
| 5,708,211 A | 1/1998 | Jepson et al. | 73/861.04 |
| 5,708,585 A | 1/1998 | Kushion | 364/431.061 |
| 5,710,370 A | 1/1998 | Shanahan et al. | 73/1.35 |
| 5,710,708 A | 1/1998 | Wiegand | 364/470.1 |
| 5,713,668 A | 2/1998 | Lunghofer et al. | 374/179 |
| 5,719,378 A | 2/1998 | Jackson, Jr. et al. | 219/497 |
| 5,736,649 A | 4/1998 | Kawasaki et al. | 73/861.23 |
| 5,741,074 A | 4/1998 | Wang et al. | 374/185 |
| 5,742,845 A | 4/1998 | Wagner | 395/831 |
| 5,746,511 A | 5/1998 | Eryurek et al. | 374/2 |
| 5,747,701 A | 5/1998 | Marsh et al. | 73/861.23 |
| 5,752,008 A | 5/1998 | Bowling | 395/500 |
| 5,764,539 A | 6/1998 | Rani | 364/557 |
| 5,764,891 A | 6/1998 | Warrior | 395/200.2 |
| 5,781,024 A | 7/1998 | Blomberg et al. | 324/763 |
| 5,781,878 A | 7/1998 | Mizoguchi et al. | 701/108 |
| 5,790,413 A | 8/1998 | Bartusiak et al. | 364/485 |
| 5,801,689 A | 9/1998 | Huntsman | 345/329 |
| 5,805,442 A | 9/1998 | Crater et al. | 364/138 |
| 5,817,950 A | 10/1998 | Wiklund et al. | 73/861.66 |
| 5,825,664 A | 10/1998 | Warrior et al. | 700/7 |
| 5,828,567 A | 10/1998 | Eryurek et al. | 700/79 |
| 5,829,876 A | 11/1998 | Schwartz et al. | 374/1 |
| 5,838,187 A | 11/1998 | Embree | 327/512 |
| 5,848,383 A | 12/1998 | Yunus | 702/102 |
| 5,854,993 A | 12/1998 | Crichnik | 702/54 |
| 5,859,964 A | 1/1999 | Wang et al. | 395/185.01 |
| 5,869,772 A | 2/1999 | Storer | 73/861.24 |
| 5,876,122 A | 3/1999 | Eryurek | 374/183 |
| 5,880,376 A | 3/1999 | Sai et al. | 73/861.08 |
| 5,887,978 A | 3/1999 | Lunghofer et al. | 374/179 |
| 5,908,990 A | 6/1999 | Cummings | 73/861.22 |
| 5,923,557 A | 7/1999 | Eidson | 364/471.03 |
| 5,924,086 A | 7/1999 | Mathur et al. | 706/25 |
| 5,926,778 A | 7/1999 | Pöppel | 702/104 |
| 5,934,371 A | 8/1999 | Bussear et al. | 166/53 |
| 5,936,514 A | 8/1999 | Anderson et al. | 340/310.01 |
| 5,940,290 A | 8/1999 | Dixon | 364/138 |
| 5,956,663 A | 9/1999 | Eryurek et al. | 702/183 |
| 5,970,430 A | 10/1999 | Burns et al. | 700/117 |
| 6,002,952 A | 12/1999 | Diab et al. | 600/310 |
| 6,014,612 A | 1/2000 | Larson et al. | 702/183 |
| 6,014,902 A | 1/2000 | Lewis et al. | 73/861.12 |
| 6,016,523 A | 1/2000 | Zimmerman et al. | 710/63 |
| 6,016,706 A | 1/2000 | Yamamoto et al. | 9/6 |
| 6,017,143 A | 1/2000 | Eryurek et al. | 700/51 |
| 6,023,399 A | 2/2000 | Kogure | 361/23 |
| 6,026,352 A | 2/2000 | Burns et al. | 702/182 |
| 6,038,579 A | 3/2000 | Sekine | 708/400 |
| 6,045,260 A | 4/2000 | Schwartz et al. | 374/183 |
| 6,046,642 A | 4/2000 | Brayton et al. | 330/296 |
| 6,047,220 A | 4/2000 | Eryurek | 700/10 |
| 6,047,222 A | 4/2000 | Burns et al. | 700/79 |
| 6,052,655 A | 4/2000 | Kobayashi et al. | 702/184 |
| 6,061,603 A | 5/2000 | Papadopoulos et al. | 700/83 |
| 6,072,150 A | 6/2000 | Sheffer | 219/121.83 |
| 6,094,600 A | 7/2000 | Sharpe, Jr. et al. | 700/19 |
| 6,112,131 A | 8/2000 | Ghorashi et al. | 700/142 |
| 6,119,047 A | 9/2000 | Eryurek et al. | 700/28 |
| 6,119,529 A | 9/2000 | Di Marco et al. | 73/861.68 |
| 6,139,180 A | 10/2000 | Usher et al. | 374/1 |
| 6,151,560 A | 11/2000 | Jones | 702/58 |
| 6,179,964 B1 | 1/2001 | Begemann et al. | 162/198 |
| 6,195,591 B1 | 1/2001 | Nixon et al. | 700/2 |
| 6,182,501 B1 | 2/2001 | Furuse et al. | 73/49.2 |
| 6,192,281 B1 | 2/2001 | Brown et al. | 700/2 |
| 6,199,018 B1 | 3/2001 | Quist et al. | 702/34 |
| 6,209,048 B1 | 3/2001 | Wolff | 710/62 |
| 6,236,948 B1 | 5/2001 | Eck et al. | 702/45 |
| 6,237,424 B1 | 5/2001 | Salmasi et al. | 73/861.17 |
| 6,263,487 B1 | 7/2001 | Stripf et al. | 717/1 |
| 6,272,438 B1 | 8/2001 | Cunningham et al. | 702/56 |
| 6,289,735 B1 | 9/2001 | Dister et al. | 73/579 |
| 6,298,377 B1 | 10/2001 | Hartikainen et al. | 709/223 |
| 6,307,483 B1 | 10/2001 | Westfield et al. | 340/870.11 |
| 6,311,136 B1 | 10/2001 | Henry et al. | 702/45 |
| 6,317,701 B1 | 11/2001 | Pyostsia et al. | 702/188 |
| 6,327,914 B1 | 12/2001 | Dutton | 73/861.356 |
| 6,347,252 B1 | 2/2002 | Behr et al. | 700/2 |
| 6,356,191 B1 | 3/2002 | Kirkpatrick et al. | 340/501 |
| 6,360,277 B1 | 3/2002 | Ruckley et al. | 709/230 |
| 6,370,448 B1 | 4/2002 | Eryurek et al. | 700/282 |
| 6,377,859 B1 | 4/2002 | Brown et al. | 700/79 |
| 6,396,426 B1 | 5/2002 | Balard et al. | 341/120 |
| 6,397,114 B1 | 5/2002 | Eryurek et al. | 700/51 |
| 6,405,099 B1 | 6/2002 | Nagai et al. | 700/159 |
| 6,425,038 B1 | 7/2002 | Sprecher | 710/269 |
| 6,434,504 B1 | 8/2002 | Eryurek et al. | 702/130 |
| 6,449,574 B1 | 9/2002 | Eryurek et al. | 702/99 |
| 6,473,656 B1 | 10/2002 | Langels et al. | 700/17 |
| 6,473,710 B1 | 10/2002 | Eryurek | 702/133 |
| 6,480,793 B1 | 11/2002 | Martin | 702/45 |
| 6,492,921 B1 | 12/2002 | Kunitani et al. | 341/118 |
| 6,493,689 B2 | 12/2002 | Kotoulas et al. | 706/23 |
| 6,505,517 B1 | 1/2003 | Eryurek et al. | 73/861.08 |
| 6,519,546 B1 | 2/2003 | Eryurek et al. | 702/130 |
| 6,532,392 B1 | 3/2003 | Eryurek et al. | 700/54 |
| 6,539,267 B1 | 3/2003 | Eryurek et al. | 700/51 |
| 6,546,814 B1 | 4/2003 | Choe et al. | 73/862.08 |
| 6,556,145 B1 | 4/2003 | Kirkpatrick et al. | 340/870.17 |
| 6,594,603 B1 | 7/2003 | Eryurek et al. | 702/104 |
| 6,601,005 B1 | 7/2003 | Eryurek et al. | 702/104 |
| 6,611,775 B1 | 8/2003 | Coursolle et al. | 702/65 |
| 6,615,149 B1 | 9/2003 | Wehrs | 702/76 |
| 6,654,697 B1 | 11/2003 | Eryurek et al. | 702/47 |
| 6,701,274 B1 | 3/2004 | Eryurek et al. | 702/140 |
| 6,754,601 B1 | 6/2004 | Eryurek et al. | 702/104 |
| 6,758,168 B2 | 7/2004 | Koskinen et al. | 122/7 |
| 6,859,755 B2 | 2/2005 | Eryurek et al. | 702/183 |
| 6,907,383 B2 | 6/2005 | Eryurek et al. | 702/183 |
| 6,970,003 B2 | 11/2005 | Rome et al. | 324/718 |
| 7,018,800 B2 * | 3/2006 | Huisenga et al. | 435/6 |
| 7,085,610 B2 | 8/2006 | Eryurek et al. | 700/29 |
| 7,098,798 B2 * | 8/2006 | Huisenga et al. | 340/635 |
| 2002/0013629 A1 | 1/2002 | Nixon et al. | |
| 2002/0032544 A1 | 3/2002 | Reid et al. | 702/183 |
| 2002/0077711 A1 | 6/2002 | Nixon | 700/19 |
| 2002/0121910 A1 | 9/2002 | Rome et al. | 324/718 |
| 2002/0145568 A1 | 10/2002 | Winter | 343/701 |
| 2002/0148644 A1 | 10/2002 | Schultz et al. | 175/39 |
| 2003/0033040 A1 | 2/2003 | Billings | 700/97 |
| 2003/0045962 A1 | 3/2003 | Eryurek et al. | |
| 2004/0128034 A1 | 7/2004 | Lenker et al. | 700/282 |
| 2004/0249583 A1 | 12/2004 | Eryurek et al. | 702/47 |

FOREIGN PATENT DOCUMENTS

| | | |
|---|---|---|
| DE | 32 13 866 A1 | 10/1983 |
| DE | 35 40 204 C1 | 9/1986 |
| DE | 40 08 560 A1 | 9/1990 |

| | | |
|---|---|---|
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 199 05 071 | 8/2000 |
| DE | 19905071 A1 | 8/2000 |
| DE | 299 17 651 U1 | 12/2000 |
| DE | 100 36 971 A1 | 2/2002 |
| DE | 102 23 725 A1 | 4/2003 |
| EP | 0 122 622 A1 | 10/1984 |
| EP | 0 413 814 A1 | 2/1991 |
| EP | 0 487 419 A2 | 5/1992 |
| EP | 0 512 794 A2 | 11/1992 |
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1 058 093 A1 | 5/1999 |
| EP | 1 022 626 A2 | 7/2000 |
| FR | 2 302 514 | 9/1976 |
| FR | 2 334 827 | 7/1977 |
| GB | 928704 | 6/1963 |
| GB | 1 534 280 | 11/1978 |
| GB | 1 534 288 | 11/1978 |
| GB | 2 310 346 A | 8/1997 |
| GB | 2 317 969 | 4/1998 |
| GB | 2 342 453 A | 4/2000 |
| GB | 2 347 232 A | 8/2000 |
| JP | 57196619 | 2/1982 |
| JP | 58-129316 | 8/1983 |
| JP | 59-116811 | 7/1984 |
| JP | 59-163520 | 9/1984 |
| JP | 59-211196 | 11/1984 |
| JP | 59-211896 | 11/1984 |
| JP | 60-000507 | 1/1985 |
| JP | 60-76619 | 5/1985 |
| JP | 60-131495 | 7/1985 |
| JP | 60-174915 | 9/1985 |
| JP | 62-30915 | 2/1987 |
| JP | 62-50901 | 9/1987 |
| JP | 64-01914 | 1/1989 |
| JP | 64-72699 | 3/1989 |
| JP | 2-05105 | 1/1990 |
| JP | 3-229124 | 10/1991 |
| JP | 4-70906 | 3/1992 |
| JP | 5-122768 | 5/1993 |
| JP | 6-95882 | 4/1994 |
| JP | 06242192 | 9/1994 |
| JP | 06-248224 | 10/1994 |
| JP | 7-063586 | 3/1995 |
| JP | 07234988 | 9/1995 |
| JP | 8-054923 | 2/1996 |
| JP | 8-102241 | 4/1996 |
| JP | 08-114638 | 5/1996 |
| JP | 8-136386 | 5/1996 |
| JP | 8-166309 | 6/1996 |
| JP | 8-247076 | 9/1996 |
| JP | 8-313466 | 11/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11-083575 | 3/1999 |
| RU | 2190267 C2 | 9/2002 |
| WO | WO 94/25933 | 11/1994 |
| WO | WO 95/23361 | 8/1995 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/14855 | 4/1998 |
| WO | WO 98/20469 | 5/1998 |
| WO | WO 98/39718 | 9/1998 |
| WO | WO 99/19782 | 4/1999 |
| WO | WO 00/41050 | 7/2000 |
| WO | WO 00/55700 | 9/2000 |
| WO | WO 00/70531 | 11/2000 |
| WO | WO 01/01213 A1 | 1/2001 |
| WO | WO 01/77766 | 10/2001 |
| WO | WO 01/90704 A2 | 11/2001 |
| WO | WO 02/27418 | 4/2002 |

OTHER PUBLICATIONS

International Search Report from Application No. PCT/US01/40791 with international filing date of May 22, 2001.
International Search Report from Application No. PCT/US01/40782 with international filing date of May 22, 2001.
U.S. Appl. No. 09/257,896 filed Feb. 25, 1999, Eryurek et al.
"A TCP/IP Tutorial" by, Socolofsky et al., Spider Systems Limited, Jan. 1991 pp. 1-23.
"Approval Standards For Explosionproof Electrical Equipment General Requirements", Factory Mutual Research, C1. No. 3615, Mar. 1989, pp. 1-34.
"Approval Standard Intrinsically Safe Apparatus and Associated Apparatus For Use In Class I, II, and III, Division 1 Hazardous (Classified) Locations", Factory Mutual Research, Cl. No. 3610, Oct. 1988, pp. 1-70.
"Automation On-line" by, Phillips et al., Plant Services, Jul. 1997, pp. 41-45.
"Climb to New Heights by Controlling your PLCs Over the Internet" by, Phillips et al., Intech, Aug. 1998, pp. 50-51.
"CompProcessor For Piezoresistive Sensors" MCA Technologies Inc. (MCA7707), pp. 1-8.
"Ethernet emerges as viable, inexpensive fieldbus", Paul G. Schreier, Personal Engineering, Dec. 1997, pp. 23-29.
"Ethernet Rules Closed-loop System" by, Eidson et al., Intech, Jun. 1998, pp. 39-42.
"Fieldbus Standard for Use in Industrial Control Systems Part 2: Physical Layer Specification and Service Definition", ISA-S50.02-1992, pp. 1-93.
"Fieldbus Standard for Use in Industrial Control Systems Part 3: Data Link Service Definition", ISA-S50.02-1997, Part 3, Aug. 1997, pp. 1-159.
Fieldbus Standard For Use in Industrial Control Systems Part 4: Data Link Protocol Specifications, ISA-S50.02-1997, Part 4, Aug. 1997, pp. 1-148.
"Fieldbus Support For Process Analysis" by, Blevins et al., Fisher-Rosemount Systems, Inc., 1995, pp. 121-128.
"Fieldbus Technical Overview Understanding FOUNDATION™ fieldbus technology", Fisher-Rosemount, 1998, pp. 1-23.
"Hypertext Transfer protocol—HTTP/1.0" by, Berners-Lee et al., MIT/LCS, May 1996, pp. 1-54.
"Infranets, Intranets, and the Internet" by, Pradip Madan, Echelon Corp, Sensors, Mar. 1997, pp. 46-50.
"Internet Technology Adoption into Automation" by, Fondl et al., Automation Business, pp. 1-5.
"Internet Protocol Darpa Internet Program Protocol Specification" by, Information Sciences Institute, University of Southern California, RFC 791, Sep. 1981.
"Introduction to Emit", emWare, Inc., 1997, pp. 1-22.
"Introduction to the Internet Protocols" by, Charles L. Hedrick, Computer Science Facilities Group, Rutgers University, Oct. 3, 1988, pp. 1-97.
"Is There A Future For Ethernet in Industrial Control?", Miclot et al., Plant Engineering, Oct. 1988, pp. 44-46, 48, 50.

"LFM/SIMA Internet Remote Diagnostics Research Project Summary Report, Stanford University, Jan. 23, 1997, pp. 1-6.

"Managing Devices with the Web" by, Howard et al., Byte, Sep. 1997, pp. 45-64.

"Modular Microkernel Links GUI And Browser For Embedded Web Devices" by, Tom Williams, pp. 1-2.

"PC Software Gets Its Edge From Windows, Components, and the Internet", Wayne Labs, I&CS, Mar. 1997, pp. 23-32.

Proceedings Sensor Expo, Aneheim, California, Produced by Expocon Managemnet Associates, Inc., Apr. 1996, pp. 9-21.

Proceedings Sensor Expo, Boston, Massachuttes, Produced by Expocon Management Associates, Inc., May 1997, pp. 1-416.

"Smart Sensor Network of the Future" by, Jay Warrior, Sensors, Mar. 1997, pp. 40-45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1-69.

"On-Line Statistical Process Control for a Glass Tank Ingredient Scale," by R.A. Weisman, *IFAC real Time Programming*, 1985, pp. 29-38.

"The Performance of Control Charts for Monitoring Process Variation," by C. Lowry et al., *Commun. Statis.—Simula.*, 1995, pp. 409-437.

"A Knowledge-Based Approach for Detection and Diagnosis of Out-Of-Control Events in Manufacturing Processes," by P. Love et al., *IEEE*, 1989, pp. 736-741.

"Advanced Engine Diagnostics Using Universal Process Modeling", by P. O'Sullivan, *Presented at the 1996 SAE Conference on Future Transportation Technology*, pp. 1-9.

Parallel, Fault-Tolerant Control and Diagnostics System for Feedwater Regulation in PWRS, by E. Eryurek et al., *Proceedings of the American Power Conference*.

"Programmable Hardware Architectures for Sensor Validation", by M.P. Henry et al., *Control Eng. Practice*, vol. 4, No. 10., pp. 1339-1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.

"Signal Processing, Data Handling and Communications: The Case for Measurement Validation", by M.P. Henry, *Department of Engineering Science, Oxford University*.

"Smart Temperature Measurement in the '90s", by T. Kerlin et al., *C&I*, (1990).

"Software-Based Fault-Tolerant Control Design for Improved Power Plant Operation," *IEEE/IFAC Symposium on Computer-Aided Control System Design*, Mar. 7-9, 1994 pp. 585-590.

A Standard Interface for Self-Validatint Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1-4.

"Application of Neural Computing Paradigms for Signal Validation," by B.R. Upadhyaya et al., *Department of Nuclear Engineering*, pp. 1-18.

"Application of Neural Networks for Sensor Validation and Plant Monitoring," by B. Upadhyaya et al., *Neural Technology*, vol. 97, No. 2, Feb. 1992 pp. 170-176.

"Automated Generation of Nonlinear System Characterization for Sensor Failure Detection," by B.R. Upadhyaya et al., *ISA*, 1989 pp. 269-274.

"In Situ Calibration of Nuclear Plant Platinum Resistance Thermometers Using Johnson Noise Methods," *EPRI*, Jun. 1983.

"Johnson Noise Thermometer for High Radiation and High-Temperature Environments," by L. Oakes et al., *Fifth Symposium on Space Nuclear Power Systems*, Jan. 1988, pp. 2-23.

"Development of a Resistance Thermometer For Use Up to 1600° C.", by M.J. de Groot et al., *Cal Lab*, Jul./Aug. 1996, pp. 38-41.

"Survey, Applications, And Prospects of Johnson Noise Thermometry," by T. Blalock et al., *Electrical Engineering Department*, 1981, pp. 2-11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249-1259.

"Field-based Architecture is Based on Open Systems, Improves Plant Performance", by P. Cleaveland, *I&CS*, Aug. 1996, pp. 73-74.

"Tuned-Circuit Dual-Mode Johnson Noise Thermometers," by R.L. Shepard et al., Apr. 1992.

"Tuned-Circuit Johnson Noise Thermometry," by Michael Roberts et al., $7^{th}$ *Symposium on Space Nuclear Power Systems*, Jan. 1990.

"Smart Field Devices Provide New Process Data, Increase System Flexibility," by Mark Boland, *I&CS*, Nov. 1994, pp. 45-51.

"Wavelet Analysis of Vibration, Part I: Theory[1]," by D.E. Newland, *Journal of Vibration and Acoustics*, vol. 116, Oct. 1994, pp. 409-416.

"Wavelet Analysis of Vibration, Part 2: Wavelet Maps," by D.E. Newland, *Journal of Vibration and Acoustics*, vol. 116, Oct. 1994, pp. 417-425.

"Development of a Long-Life, High-Reliability Remotely Operated Johnson Noise Thermometer," by R.L. Shepard et al., *ISA*, 1991, pp. 77-84.

"Application of Johnson Noise Thermometry to Space Nuclear Reactors," by M.J. Roberts et al., *Presented at the 6th Symposium on Space Nuclear Power Systems*, Jan. 9-12, 1989.

"A Decade of Progress in High Temperature Johnson Noise Thermometry," by T.V. Blalock et al., *American Institute of Physics*, 1982 pp. 1219-1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by. E. Taya et al., *SICE*, 1995, pp. 1605-1608.

"Development and Application of Neural Network Algorithms For Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1997), pp. 68-88.

"Keynote Paper: Hardware Compilation-A New Technique for Rapid Prototyping of Digital Systems-Applied to Sensor Validation", by M.P. Henry, *Control Eng. Practice*, vol. 3, No. 7., pp. 907-924, (1995).

"The Implications of Digital Communications on Sensor Validation", by M. Henry et al., *Report No. QUEL 1912/92*, (1992).

"In-Situ Response Time Testing of Thermocouples", *ISA*, by H.M. Hashemian et al., Paper No. 89-0056, pp. 587-593, (1989).

"An Integrated Architecture For Signal Validation in Power Plants," by B.R. Upadhyaya et al., *Third IEEE International Symposium on Intelligent Control*, Aug. 24-26, 1988, pp. 1-6.

"Integration of Multiple Signal Validation Modules for Sensor Monitoring," by B. Upadhyaya et al., *Department of Nuclear Engineering*, Jul. 8, 1990, pp. 1-6.

"Intelligent Behaviour for Self-Validating Sensors", by M.P. Henry, *Advances In Measurement*, pp. 1-7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.

"Neural Networks for Sensor Validation and Plant Monitoring," by B. Upadhyaya, *International Fast Reactor Safety Meeting*, Aug. 12-16, 1990, pp. 2-10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151-162.

"Thermocouple Continuity Checker," IBM Technical Disclosure Bulletin, vol. 20, No. 5, p. 1954 (Oct. 1977).

"A Self-Validating Thermocouple," Janice C-Y et al., IEEE Transactions on Control Systems Technology, vol. 5, No. 2, pp. 239-253 (Mar. 1997).

*Instrument Engineer' Handbook*, Chapter IV entitled "Temperature Measurements," by T.J. Claggett, pp. 266-333 (1982).

"emWare's Releases EMIT 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," 6[Th]. WWW Conference Workshop on Embedded Web Technology, Santa Clara, CA (Apr. 7, 1997).

Microsoft Press Computer Dictionary, 3rd Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1-58 and 169-204.

"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).

"Transient Pressure Signal in Mechanical Heart Valve Caviation," by Z.J. Wu et al., pp. M555-M561 undated.

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED-vol. 28, pp. 297-298 (Nov. 6-11, 1994).

"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).

"Developing Predictive Models for Cavitation Erosion," *Codes and Standards in A Global Environment*, PVP-vol. 259, pp. 189-192 (1993).

"Self-Diagnosing Intelligent Motors: A Key Enabler for Next Generation Manufacturing System," by Fred M. Discenzo et al., pp. 3/1-3/4 (1999).

"A Microcomputer-Based Instrument for Applications in Platinum Resistance Thermometry," by H. Rosemary Taylor and Hector A. Navarro, Journal of Physics E. Scientific Instrument, vol. 16, No. 11, pp. 1100-1104 (1983).

"Experience in Using Estelle for the Specification and Verification of a Fieldbus Protocol: FIP," by Barretto et al., Computer Networking, pp. 295-304 (1990).

"Computer Simulation of H1 Field Bus Transmission," by Utsumi et al., Advances in Instrumentation and Control, vol. 46, Part 2, pp. 1815-1827 (1991).

"Progress in Fieldbus Developments for Measuring and Control Application," by A. Schwaier, Sensor and Acuators, pp. 115-119 (1991).

"Ein Emulationssystem zur Leistungsanalyse von Feldbussystemen, Teil 1," by R. Hoyer, pp. 335-336 (1991).

"Simulatore Integrato: Controllo su bus di campo," by Barabino et al., Automazione e Strumentazione, pp. 85-91 (Oct. 1993).

"Ein Modulares, verteiltes Diagnose-Expertensystem für die Fehlerdiagnose in lokalen Netzen," by Jürgen M. Schröder, pp. 557-565 (1990).

"Fault Diagnosis of Fieldbus Systems," by Jürgen Quade, pp. 577-581 (Oct. 1992).

"Ziele und Anwendungen von Feldbussystemen," by T. Pfeifer et al., pp. 549-557 (Oct. 1987).

"PROFIBUS Infrastructure Measures," by Tilo Pfeifer et al., pp. 416-419 (Aug. 1991).

"Simulation the Time Behaviour of Fieldbus Systems," by O. Schnelle, pp. 440-442.

"Modélisation et simulation d'un bus de terrain: FIP," by Song et al, pp. 5-9 undated.

"Field Bus Networks for Automation Systems Containing Intelligent Functional Unites," by W. Kriesel et al., pp. 486-489 (1987).

"Field Buses for Process Interconnection with Digital Control Systems," Tecnología, pp. 141-147 (1990).

"Decentralised Systems with Real-Time Field Bus," Netzwerke, Jg. Nr.3 v. 14.3, 4 pp. (1990).

"Process Measurement and Analysis," by Liptak et al., Instrument Engineers' Handbook, Third Edition, pp. 528-530, (1995).

"Improving Dynamic Performance of Temperature Sensors With Fuzzy Control Techniques," by Wang Lei et al., pp. 872-873 (1992).

"Microsoft Press Computer Dictionary" 2nd Edition, 1994, Microsoft Press. p. 156.

International Search Report from Application No. PCT/02/14560 with international filing date of May 8, 2002.

International Search Report from Application No. PCT/US02/14934 with international filing date of May 8, 2002.

"On-Line Tool Condition Monitoring System With Wavelet Fuzzy Neural Network," by Li Xiaoli et al., pp. 271-276 (1997).

"Optimal Design of the Coils of An Electromagnetic Flow Meter," by Michalski, A. et al., IEEE Transactions on Magnetics, vol. 34, Issue 5, Part 1, pp. 2563-2566 (1998)

"Magnetic Fluid Flow Meter for Gases," Popa, N.C., IEEE Transactions on Magnetics, vol. 30, Issue 2, Part 1-2, pp. 936-938 (1993).

"New Approach to A Main Error Estimation for Primary Transducer of Electromagnetic Flow Meter," by Michalski, A., IEEE Instrumentation and Measurement Technology Conference Proceedings, vol. 2, pp. 1093-1097 (1998).

"Additional Information From Flowmeters Via Signal Analysis," by Amadi-Echendu, J.E. et al., IEEE Instrumentation and Measurement Technology Conference Record, vol. 7, pp. 187-193 (1990).

International Search Report from Application No. PCT/US02/06606 with international filing date of Mar. 5, 2002.

International Search Report from Application No. PCT/US02/30465 with international filing date of Sep. 25, 2002.

"What is a weighted moving average?", *DAU STAT Refresher*, http://cne.gmu.edu/modules/dau/stat/myaygs/wma_bdy.html. (1995).

U.S. Appl. No. 10/675,014, filed Sep. 2003, Longsdorf et al.

U.S. Appl. No. 10/744,809, filed Dec. 2003, Brown et al.

"Statistics Glossary: Time Series Data", by Easton et al., http://www.stats.gla.ac.uk/steps/glossary/time_series.html, Sep. 1997.

"The Indicators Story", Sustainable Seattle, pp. 55-59, 1998.

"Detecting Regimes in Temperature Time Series", by Clemins et al., *Artificial Neural Networks in Engineerin, Proceedings*, pp. 727-732, 2001.

"Re: Digital Filter-Moving Average", The Math Forumn, http://mathforum.org/discuss/sci.math/a/t/177212, Sep. 28, 1998.

U.S. Appl. No. 10/893,144, filed Jul. 2004, Brown et al.

"Notification of Transmittal of the International Search Report and the Written opinion of the International Searching Authority", or the Declaration for PCT/US2004/017300.

"Invitation to Pay Additional Fees" for PCT/US2004/031678.

"Notification of Transmittal of the International Search Report or the Declaration", PCT/US2004/025291.

"Notification of Transmittal of the International Preliminary Report on Patenatability", PCT/US2004/031678.

\* cited by examiner

TWO-WIRE PROCESS CONTROL LOOP DIAGNOSTICS

BACKGROUND OF THE INVENTION

The present invention relates to industrial process control and monitoring systems. More specifically, the present invention relates to diagnostics of industrial process control and monitoring systems which utilize two-wire process control loops to transmit information.

Industrial process control and monitoring systems are used in many applications to control and/or monitor operation of an industrial process. For example, an oil refinery, chemical processing plant, or paper manufacturing facility may have numerous processes which must be monitored and controlled.

In such industrial processes, process variables are measured at remote locations across the process. Example process variables include temperature, pressure, flow and the like. This information is transmitted over a two-wire process control loop to a central location, for example, a control room. Similarly, process variables can be controlled using controllers placed in the process. The controllers receive control information from the two-wire process control loop and responsively control a process variable, for example by opening or closing a valve, heating a process fluid, etc.

Various protocols have been used to communicate on two-wire process control loops. One protocol uses a 4-20 mA signal to carry information on the loop. The 4 mA signal can represent a zero or low value of a process variable while the 20 mA signal can represent a high or full scale value. The current can be controlled by a process variable transmitter to values between 4 and 20 mA to represent intermediate values of the process variable. A more complex communication technique is the HART® communication protocol in which digital information is superimposed onto a 4-20 mA signal. Typically, in such configurations a separate two-wire process control loop is required for each field device.

A more complex communication technique used on two-wire process control loops is generally referred to as fieldbus-based protocols, such as Foundation™ fieldbus. In a Fieldbus protocol, all information is transmitted digitally and the analog current level on the process control loop is not required to carry information. One advantage of such a configuration is that multiple process variable transmitters or controllers can be coupled in series on a single process control loop. Each device on the loop has an address such that it can identify messages which are addressed to it. Similarly, messages transmitted by a field device can include the address of the device so that the sender can be identified.

SUMMARY

A diagnostic device for coupling to a process control loop includes digital communication circuitry configured to receive a digital communication signal from the process control loop. The digital communication signal is a digitally modulated analog signal on the process control loop which is modulated to a plurality of discrete analog signal levels representative of digital values. Diagnostic circuitry diagnoses operation of the process control loop based upon the digitally modulated analog signal.

DETAILED DESCRIPTION

The present invention is directed to diagnostics in a process control loop including diagnostics of the wiring used in a two-wire process control loop itself, as well as other devices connected to the process control loop. In particular, the present invention provides diagnostics including detection of a failed or potentially failing component in a two-wire process control loop operating in accordance with a fieldbus based protocol in which multiple devices can be connected to a single two-wire process control loop.

Figure 1:
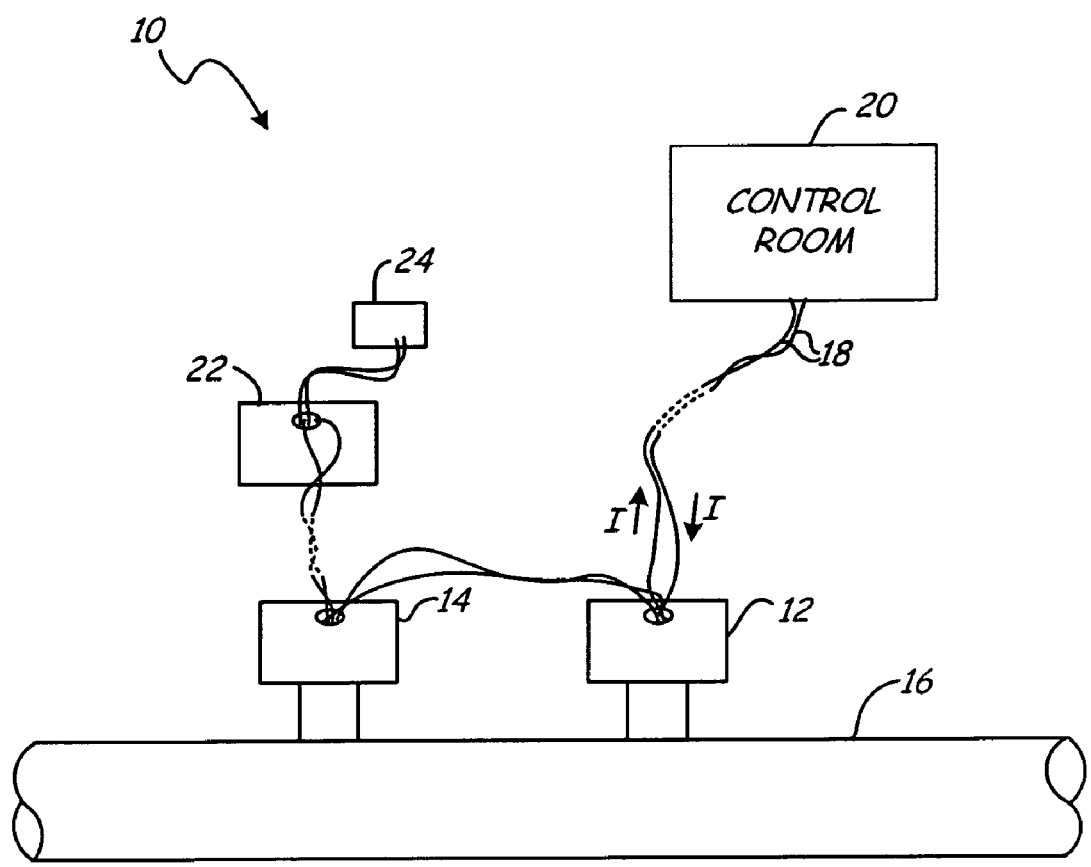
FIG. 1 is a simplified diagram of a process control or monitoring installation which includes a two-wire process control loop.

FIG. 1 is a simplified diagram showing a process control or monitoring system 10 including field devices 12 and 14 coupled to process piping 16. Devices 12 and 14 are coupled to a single two-wire process control loop 18 which in turn couples to a control room 20. FIG. 1 also illustrates a two-wire process control loop diagnostic device 22 coupled to loop 18. The loop 18 carries a current I which can be used to provide power to all of the field devices on loop 18 and can be generated at control room 20. Information is transmitted digitally on loop 18 by modulating a digital signal on top of the loop current I. For example, devices 12 and 14 can include unique addresses such that they are able to uniquely identify messages which they transmit, as well as identify which received messages are addressed to them. Devices 12 and 14 can comprise any type of field device including process variable transmitters and controllers. The process control loop 18 terminates at a segment terminator 24. The term "segment" refers to a portion of or all of two-wire process control loop 18.

Figure 2:
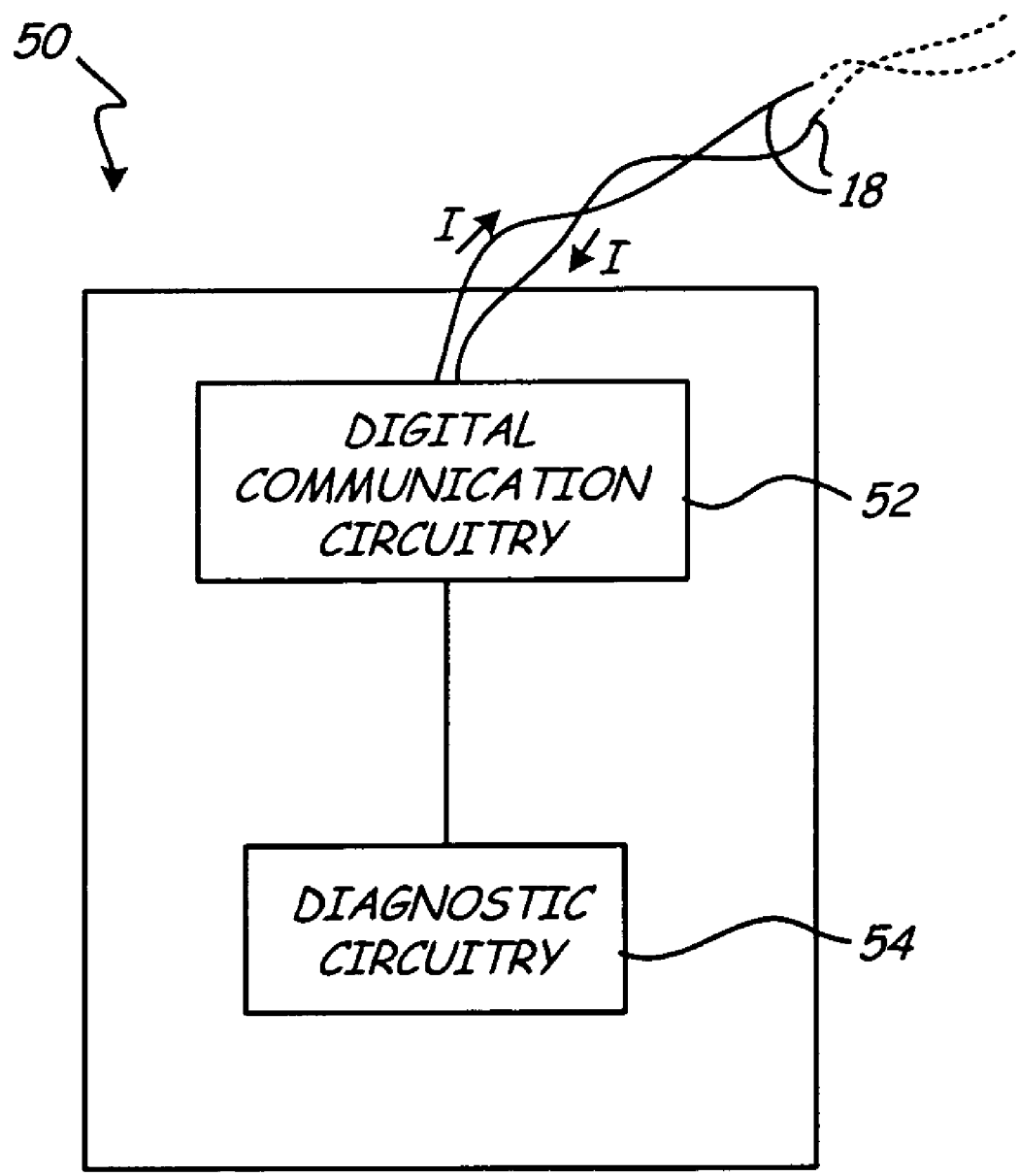
FIG. 2 is a simplified block diagram of a process control loop diagnostic device.

FIG. 2 is a simplified block diagram of a two-wire process control loop diagnostic device 50 in accordance with the present invention, similar to device 22 shown in FIG. 1. Diagnostic device 50 couples to two-wire process control loop 18 and includes digital communication circuitry 52 and diagnostic circuitry 54. Two-wire process control loop diagnostic device 50 can, in some configurations, be implemented in field device 12, field device 14, stand-alone diagnostic device 22 and/or control room 20.

Figure 3A:
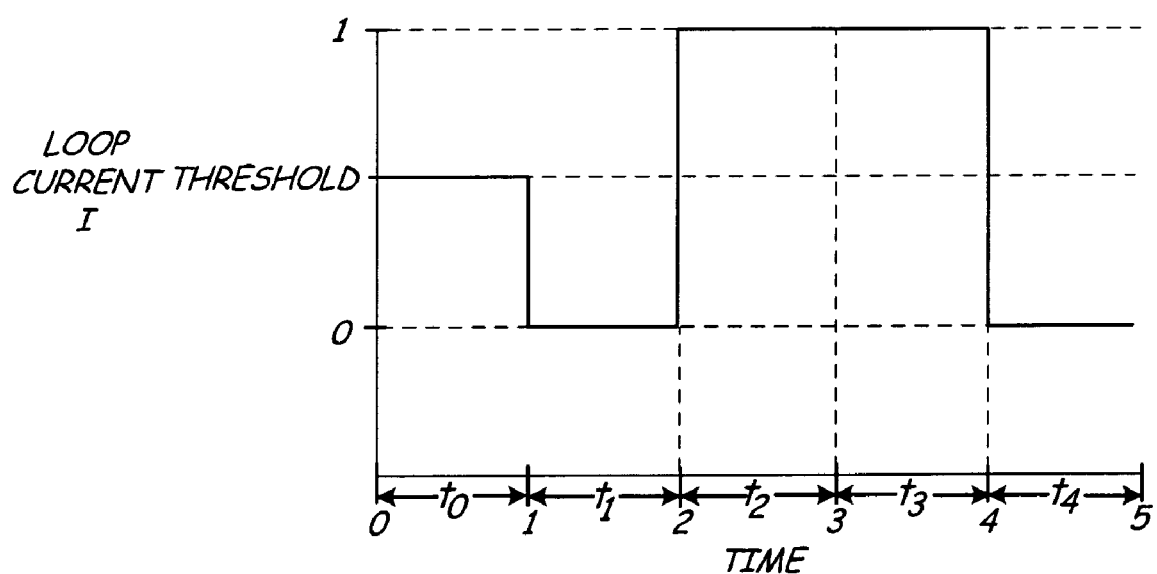
FIGS. 3A and 3B are graphs of loop current I versus time.
Figure 3B:
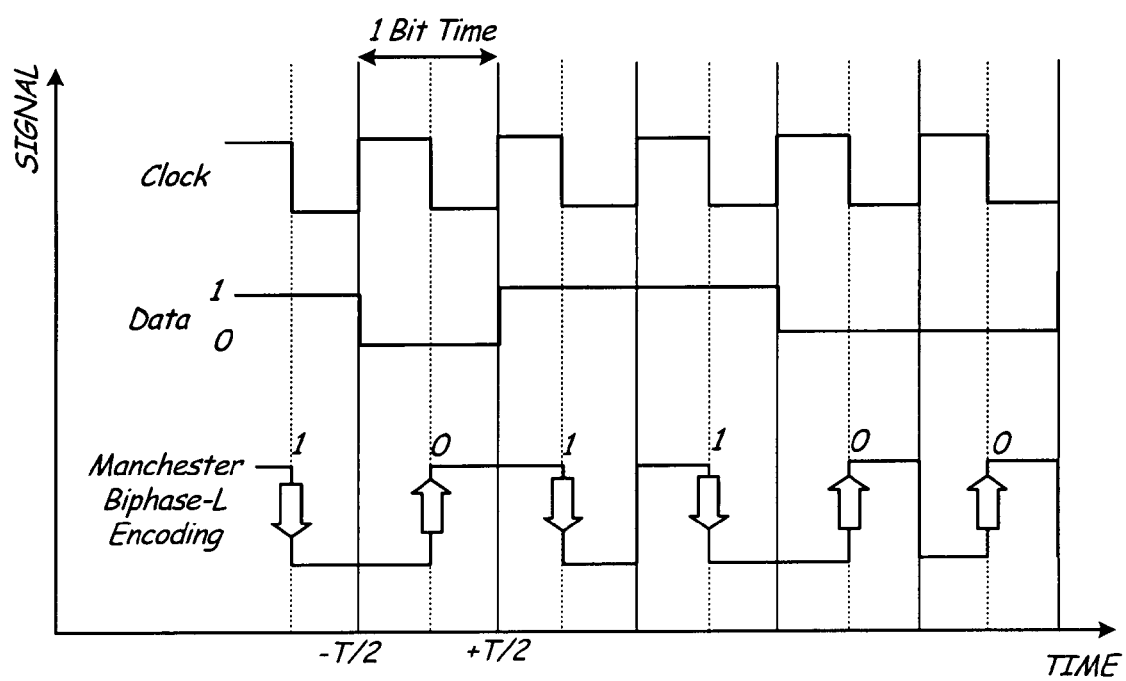

During operation, digital communication circuitry 52 receives a digital communication signal from the two-wire process control loop 18. This digital communication signal comprises an analog signal which has been digitally modulated. Such modulation is in accordance with known techniques. For example, the loop current I can be caused to vary periodically such that a variation above a certain threshold represents a binary 1 and a variation below a particular threshold represents a binary 0. Such a configuration is illustrated in FIG. 3A which is a graph of the loop current I versus time. In FIG. 3A, the time axis of the graph has been divided into five time periods: $t_0$, $t_1$, $t_2$, $t_3$ and $t_4$. During period to, the current level I is undetermined and represents neither a 0 or a 1. During periods $t_1$ and $t_4$, the current level I represents a binary 0. Similarly, during periods $t_2$ and $t_3$, the loop current level I represents a binary 1. Another data encoding technique could break each bit period into two equal parts as shown in FIG. 3B. A binary 1 is represented by the current level being above threshold value during first half of the bit time and below a threshold during the second half. A binary 0 is represented by the first half being below the threshold and the second half being above.

The diagnostic circuitry 54 illustrated in FIG. 2 performs diagnostics based upon the digitally modulated analog signal I. More specifically, the diagnostic circuitry 54 performs diagnostics based upon analog properties of the digitally modulated analog signal including signal amplitude, wave shape, current, bit error rate (BERT), segment impedance, or other parameters obtained by monitoring current on loop 18. Further, by monitoring which device transmitted a particular signal, the diagnostic circuitry 54 can identify a particular device on the loop 18 which has failed or may fail in the future.

Figure 4:
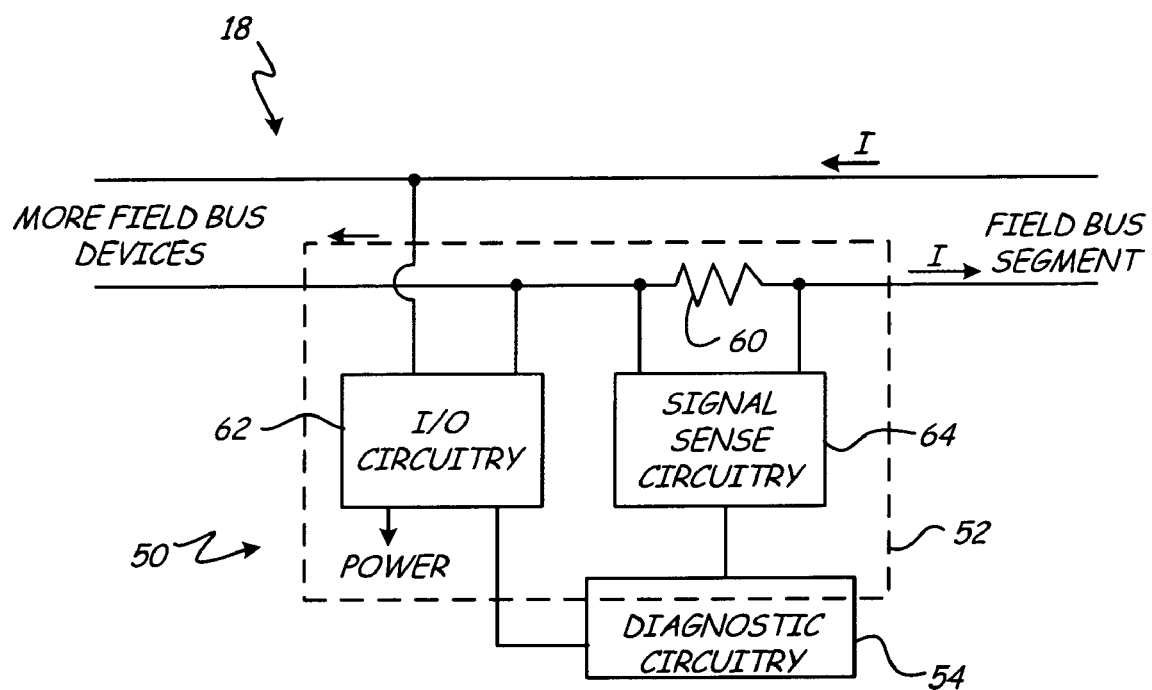
FIG. 4 is a more detailed diagram showing digital communication circuitry of FIG. 2.

FIG. 4 is a more detailed diagram of diagnostic device 50 and illustrates one configuration of digital communication circuitry 52 in greater detail. Digital communication circuitry 52 includes a sense resistor 60 coupled in series with Input/Output (I/O) circuitry 62 and other devices on the two-wire process control loop 18. A signal sense circuit 64 is coupled across sense resistor 60 and provides an output to diagnostic circuitry 54. Diagnostic circuitry 54 optionally connects to I/O circuitry 62. I/O circuitry 62 is configured to digitally communicate over process control loop 18 and, in some configurations, is configured to provide power to diagnostic device circuitry which is generated from the loop current I through loop 18. Signal sense circuitry 64 receives a voltage signal generated across sense resistor 60 which is related to the loop current I. Signal sense circuitry can optionally amplify this signal, digitize this signal, and optionally perform additional preprocessing before providing a digital presentation of the voltage signal to diagnostic circuitry 54. Signal sense circuitry 64 can comprise, for example, a digital signal processing (dsp) integrated circuit and associated hardware.

Figure 5:
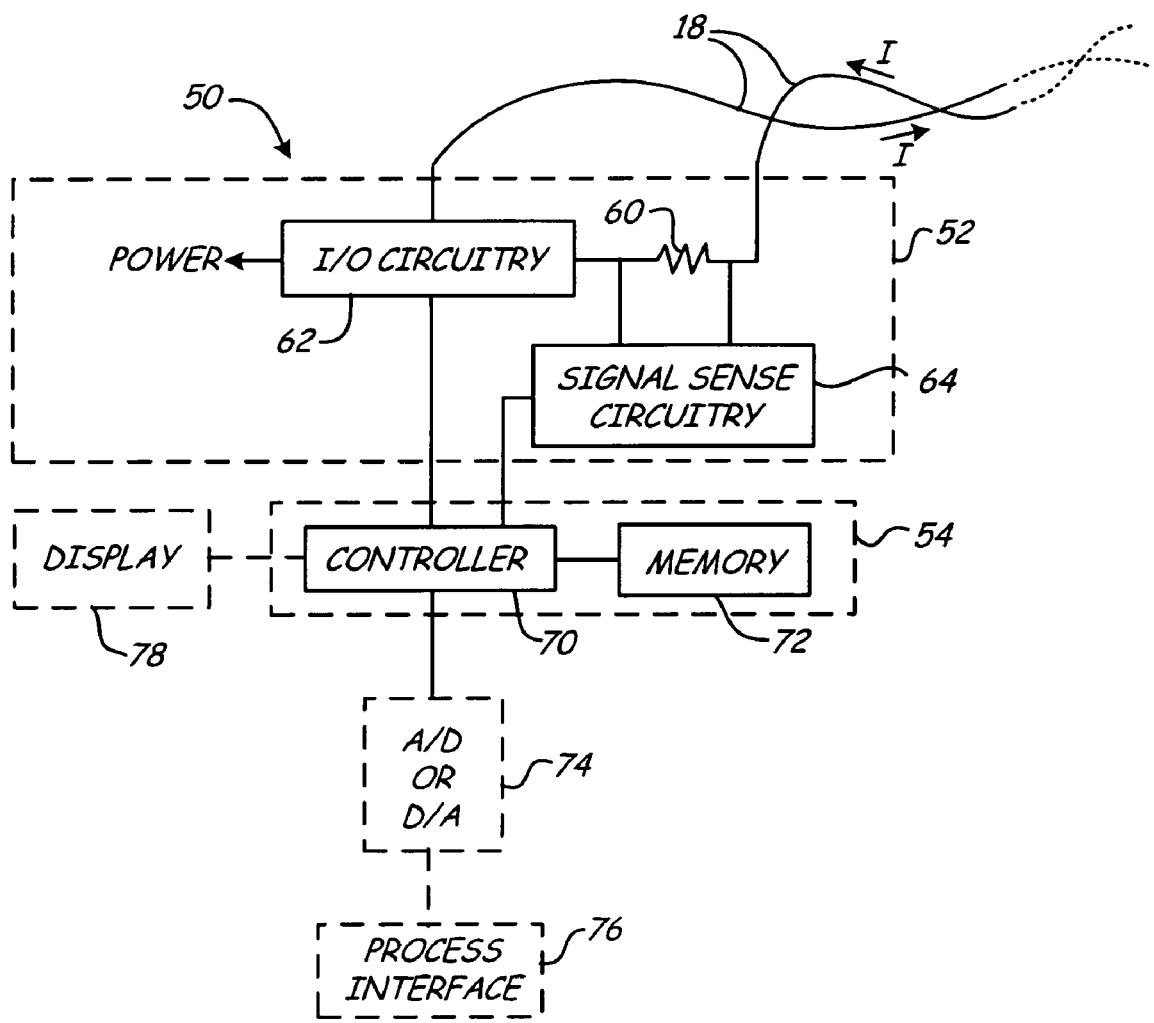
FIG. 5 is a more detailed diagram of the process control loop diagnostic device.

FIG. 5 is a simplified diagram of a diagnostic device configured as a process variable transmitter or process controller. In FIG. 5, diagnostic circuitry 54 is shown as implemented in a digital controller 70 and memory 72. Controller 70 can comprise, for example, a microprocessor or the like which operates in accordance with programming instructions in memory 72. A process interface 76 can comprise a process variable sensor for sensing a process variable, or can comprise a control element for controlling a process, for example by positioning a valve. When configured as a process variable sensor, element 74 comprises an analog to digital converter and related circuitry which provides a digital signal representation to controller 70. Controller 70 is configured to transmit information related to the sensed process variable over loop 18. Similarly, if process interface 76 is configured as a control element, element 74 comprises a digital to analog converter and related circuitry which converts a digital signal from controller 70 to an analog value for controlling the process.

The diagnostic device can be implemented in any of the example devices illustrated in FIG. 1 including a process variable transmitter or controller, a stand-alone diagnostic device 22, or in control room circuitry 20. In one configuration, an optional display 78 is provided which can be used to display diagnostic information to an operator. The display can provide diagnostic help status, and a local display is an indication of all devices on a loop segment. In an intrinsically safe configuration, the diagnostics can be located on the intrinsically safe side of the intrinsic safety barrier thereby providing more detailed and accurate diagnostics, including diagnostics of the intrinsically safe barrier itself.

The diagnostics performed by diagnostic circuitry 54 can be tailored to each individual two-wire process control loop segment by having the ability to characterize the segment. When the diagnostic device is initially installed on a new or existing segment, the device can analyze the communications from each field device, as each field device performs normal process communications. This information can be saved, for example in memory 72, for future reference conditions for each device individually. This saved data can be used to identify normal operation and provide a baseline for use in subsequent diagnostics. Characterization of each device in this manner allows for more precise diagnostics. Additionally, each device can be compared to standards in accordance with specific communication protocols, such as Fieldbus protocols, to ensure that the device is conforming to appropriate standards.

One example measurement performed by a diagnostic circuitry 54 is based on the amplitude of the digitally modulated analog signal from individual field devices. In such a configuration, the amplitude can be compared with stored threshold values (or amplitude signatures) and if the amplitude is outside of those thresholds a failure indication can be provided. If a single device is failing the test, this can be an indication of a possible failure of the device that transmitted the signal. On the other hand, if multiple devices are failing such a test, this can indicate a problem with something other than a particular device. For example, wiring within a specific segment of loop 18 or a failure of a power supply located in the control room 20, etc. The advantage of such diagnostics includes the detection of an impending failure in a particular two-wire loop segment prior to its actual failure. This allows the two-wire loop segment to be repaired with minimal down time. Additional diagnostics can include the detection of a clipped wave form which may indicate a possible increase in quiescent current of a field device thereby causing unbalanced modulation. Another potential cause of a clipped signal is inadequate terminal voltage at the field device. This may be due to a power supply voltage or, in an intrinsically safe configuration, a faulty intrinsic safety barrier.

In another example configuration, the signal sense circuitry 64 digitizes the digitally modulated analog signal such that the complete signal wave shape is available to diagnostic circuitry 54. In such a configuration, diagnostic circuitry 54 can perform diagnostics on the complete wave shape such that, for example, the rise and fall times of transitions in the signal can be measured. Further, the communication signal can be characterized over time at a particular installation and used as a reference to continually compare a live signal and detect changes in amplitude over time. By comparing the signals from each device to an initial reference, an indication of component failure or damage to the field device can be detected. A change in rise and fall times can also indicate a change in two-wire process control loop 18. Using a combination of amplitude and rise/fall times of the individual field devices, in comparison of the changes to all field devices on the segment, allows for a detailed device and bus analysis. On a normally operating segment, if a single device provides a change in amplitude, that device could be flagged as potentially having an impending failure. If a comparison is done to the other devices on the segment, and those other devices all indicate similar changes in amplitude, then a mechanical/wiring fault, power supply or intrinsic safety barrier fault may be indicated.

In another example configuration, the diagnostic circuitry 54 monitors the current I created in loop 18 using, for example, the sense resistor 60 and an analog to digital converter which measures the voltage drop across the sense resistor 60. By monitoring the DC value of the current I, the diagnostic circuitry 54 can detect improper variations in the DC current. For example, a variation in the DC current can indicate that a device connected to the loop has an increase in its shunt set current which could indicate a pending fault in the media access unit (MAU) circuitry for that particular field device. It may also indicate an electrical short in the two-wire loop wiring. Similarly, a reduction in the segment current can also indicate an impending fault.

The signal sense circuitry 64 and diagnostic circuitry 54 can be implemented in a single component or across a number of components and may share individual components. Preferably, the circuitry should have adequate processing bandwidth to perform the diagnostics in substantially real time. This can be accomplished with a single microprocessor or through the use of a digital signal processor (DSP) or other type of secondary microprocessor. One example of a diagnostic that requires substantial processing bandwidth is monitoring the signal noise on the loop 18 from, for example, the two terminals which are used to connect to loop 18, or between one of the connections to loop 18 and the housing or other electrical ground. With sufficient processing speed, analysis calculations such as a standard deviation, a Root Mean Square (RMS), or a Fast Fourier Transform (FFT) can be performed and used to detect differences in noise characteristics. An increase in noise, for example at 60 Hz from one of the terminals to ground can indicate a possible fault in the electrical grounding.

Another example diagnostic can be through the monitoring of the bit error rate (BERT) of each device connected to the two-wire loop 18. If a single device on the loop 18 shows a trend towards a higher bit error rate than a baseline for a particular installation, this can be an indication that the device is failing and may require service. Depending upon the rate at which the bit error rate increases, an indication can be provided to an operator as either a warning of degradation or an indication of imminent failure. Prediction of this impending failure allows the device to be repaired at the next scheduled maintenance interval.

In another example configuration, I/O circuitry 62 is configured to apply a high frequency pulse to loop 18. This high frequency pulse can be measured by the signal sense circuitry 64 in another device and used to determine electrical impedance on loop 18 between the two devices. The high frequency pulse can be placed during normal bus communications so as to not disrupt communications over the loop 18. By measuring the rise and fall times in amplitude of the received pulse, an impedance measurement can be performed. A comparison of this measurement to a baseline measurement for the installation can be used to provide diagnostics. In one configuration, the high frequency pulse is generated by a simple device, for example, a device which is included in the terminator 24 for the end of the segment of the loop 18 as shown in FIG. 1.

As the total number of devices which can be placed on a segment 18 is limited by the current consumption of all of the devices coupled to the segment, preferably the circuitry of the present invention operates using techniques to reduce power consumption. For example, the diagnostics can be performed during periods when other circuitry in a particular field device does not require additional power.

Although aspects of the diagnostics of the present invention are illustrated as discrete components, various functions can be implemented by a single component or shared between components. Aspects of the present invention can be implemented in software programming (stored in, for example, memory 72), can be implemented in hardware, or can be shared between hardware and software including a Link Active Scheduler (LAS). A Link Active Scheduler (LAS) is a deterministic, centralized bus scheduler that maintains a list of transmission times for all data buffers in all devices that need to be cyclically transmitted. Only one Link Master (LM) device on an H1 fieldbus Link can be functioning as that link's LAS.

Although the present invention has been described with reference to preferred embodiments, workers skilled in the art will recognize that changes may be made in form and detail without departing from the spirit and scope of the invention. As used herein, a two-wire process control loop includes field devices coupled to the loop in addition to loop wiring.

What is claimed is:

1. A diagnostic device for coupling to a two-wire process control loop of an industrial process control or monitoring system, comprises:
    digital communication circuitry configured to receive a digital communication signal from the two-wire process control loop, the digital communication signal comprising a digitally modulated analog signal on the two-wire process control loop which is modulated to a plurality of discrete analog signal levels representative of digital values; and
    diagnostic circuitry configured to diagnose operation of the two-wire process control loop based upon the digitally modulated analog signal.

2. The apparatus of claim 1 wherein the digital communication circuitry includes a sense resistor.

3. The apparatus of claim 1 including an analog to digital convertor configured to digitize the digitally modulated analog signal.

4. The apparatus of claim 1 wherein the diagnostic circuitry monitors amplitude of the digitally modulated analog signal.

5. The apparatus of claim 1 wherein the diagnostic circuitry monitors wave shape of the digitally modulated analog signal.

6. The apparatus of claim 1 wherein the diagnostic circuitry monitors a bit error rate (BERT) of digital transmissions on the two-wire process control loop.

7. The apparatus of claim 1 wherein the diagnostic circuitry monitors impedance of the two-wire process control loop.

8. The apparatus of claim 7 wherein the impedance is monitored by receipt of a high frequency signal on the two-wire process control loop.

9. The apparatus of claim 1 wherein the diagnostic circuitry compares a parameter of the digitally modulated analog signal to a stored value and responsively provides a diagnostic output.

10. The apparatus of claim 1 wherein the diagnostic circuitry correlates diagnostic information based upon the digitally modulated analog signal and a particular device on the two-wire process control loop which transmitted the digitally modulated analog signal.

11. The apparatus of claim 1 wherein the diagnostic circuitry performs diagnostics on a device coupled to the two-wire process control loop.

12. The apparatus of claim 1 wherein the diagnostic circuitry performs diagnostics on wiring of the two-wire process control loop.

13. The apparatus of claim 1 including a display configured to display diagnostic information.

14. The apparatus of claim 1 including a process interface for sensing or controlling a process variable of the process.

15. The apparatus of claim 1 wherein the diagnostic device is configured to mount in the field of the industry process control or monitoring system.

16. The apparatus of claim 1 wherein the digital communication circuitry and the diagnostic circuitry are powered with power received from the two-wire process control loop.

17. The apparatus of claim 1 wherein the diagnostic circuitry diagnoses operation of a process device of the two-wire process control loop.

18. A method for diagnosing a two-wire process control loop of the type used in an industrial process control or monitoring system, comprising:
  receiving digital communication signals from a plurality of devices coupled to the two-wire process control loop, the digital communication signals comprising a digitally modulated analog signal which is modulated to a plurality of discreet analog signal levels representative of digital values;
  measuring a property of the digitally modulated analog signal;
  diagnosing operation of the two-wire process control loop based upon the measured property of the digitally modulated analog signal; and
  providing an output based upon the diagnosing.

19. The method of claim 18 wherein measuring a property comprises monitoring amplitude of the digitally modulated analog signal.

20. The method of claim 18 wherein measuring a property comprises monitoring wave shape of the digitally modulated analog signal.

21. The method of claim 18 wherein measuring a property comprises monitoring a bit error rate (BERT) of digital transmissions on the two-wire process control loop.

22. The method of claim 18 wherein measuring a property comprises monitoring impedance of the two-wire process control loop.

23. The method of claim 22 wherein measuring a property comprises monitoring by receiving a high frequency signal on the two-wire process control loop.

24. The method of claim 18 including comparing a parameter of the digitally modulated analog signal to a stored value and responsively providing a diagnostic output.

25. The method of claim 18 includes correlating diagnostic information based upon the digitally modulated analog signal and a particular device on the two-wire process control loop which transmitted the signal.

\* \* \* \* \*

(12) EX PARTE REEXAMINATION CERTIFICATE (9055th)
United States Patent
Huisenga et al.

(10) Number: US 7,321,846 C1
(45) Certificate Issued: Jun. 5, 2012

(54) TWO-WIRE PROCESS CONTROL LOOP DIAGNOSTICS

(75) Inventors: Garrie D. Huisenga, Chaska, MN (US); Randy J. Longsdorf, Chaska, MN (US); Donald R. Lattimer, Chaska, MN (US)

(73) Assignee: Rosemount Inc., Eden Prairie, MN (US)

Reexamination Request:
No. 90/011,608, Jun. 23, 2011

Reexamination Certificate for:
Patent No.: 7,321,846
Issued: Jan. 22, 2008
Appl. No.: 11/543,349
Filed: Oct. 5, 2006

(51) Int. Cl.
*G06F 11/00* (2006.01)
*G06F 11/30* (2006.01)

(52) U.S. Cl. ........................................ 702/183; 702/188
(58) Field of Classification Search .................... None
See application file for complete search history.

(56) References Cited

To view the complete listing of prior art documents cited during the proceeding for Reexamination Control Number 90/011,608, please refer to the USPTO's public Patent Application Information Retrieval (PAIR) system under the Display References tab.

*Primary Examiner* — Anjan Deb

(57) ABSTRACT

A diagnostic device for coupling to a process control loop includes digital communication circuitry configured to receive a digital communication signal from the process control loop. The digital communication signal is a digitally modulated analog signal on the process control loop which is modulated to a plurality of discrete analog signal levels representative of digital values. Diagnostic circuitry diagnoses operation of the process control loop which may include field devices of the process control loop based upon the digitally modulated analog signal.

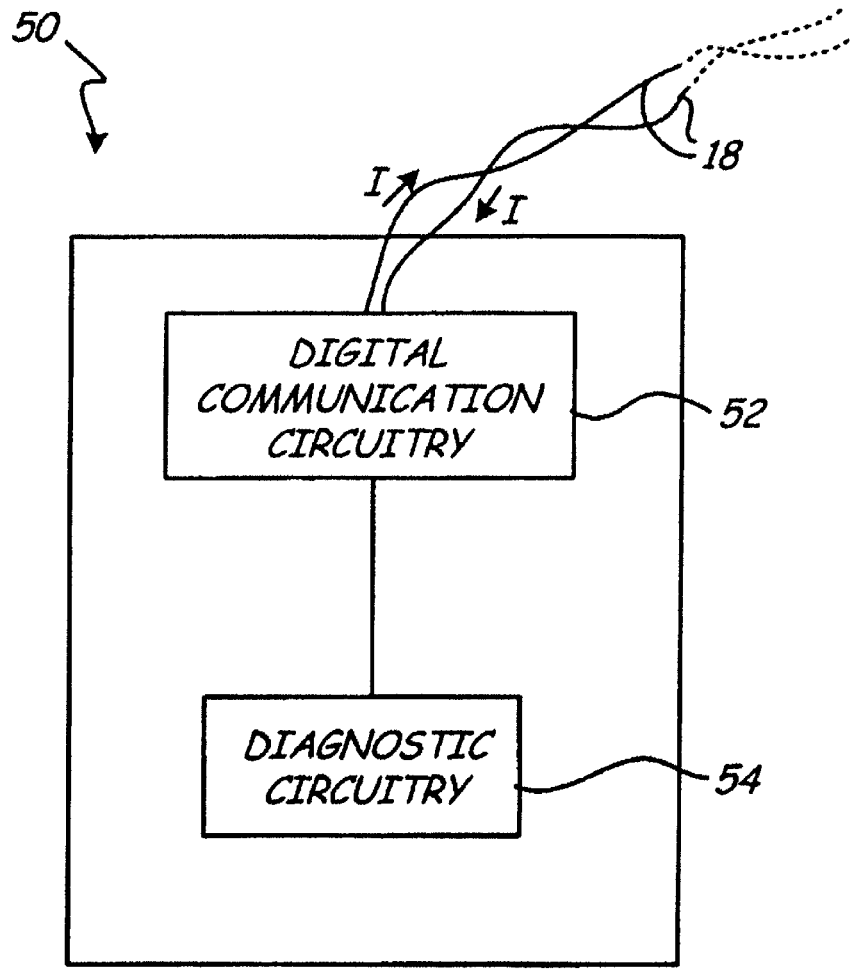

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 7, 8, 22 and 23 are cancelled.

Claims 1 and 18 are determined to be patentable as amended.

Claims 2-6, 9-17, 19-21, 24 and 25, dependent on an amended claim, are determined to be patentable.

1. A diagnostic device for coupling to a two-wire process control loop of an industrial process control or monitoring system, comprises:
   digital communication circuitry configured to receive a digital communication signal from the two-wire process control loop, the digital communication signal comprising a digitally modulated analog signal on the two-wire process control loop which is modulated to a plurality of discrete analog signal levels representative of digital values; [and]
   diagnostic circuitry configured to diagnose operation of the two-wire process control loop based upon the digitally modulated analog signal;
   *wherein the diagnostic circuitry monitors impedance of the two-wire process control loop; and*
   *wherein the impedance is monitored by receipt of a high frequency signal on the two-wire process control loop.*

18. A method for diagnosing a two-wire process control loop of the type used in an industrial process control or monitoring system, comprising:
    receiving digital communication signals from a plurality of devices coupled to the two-wire process control loop, the digital communication signals comprising a digitally modulated analog signal which is modulated to a plurality of discreet analog signal levels representative of digital values;
    measuring a property of the digitally modulated analog signal *by receiving a high frequency signal on the two-wire process control loop, wherein the property of the two-wire process control loop comprises impedance of the two-wire process control loop*;
    diagnosing operation of the two-wire process control loop based upon the measured property of the digitally modulated analog signal; and
    providing an output based upon the diagnosing.

* * * * *